(12) United States Patent
Jackson

(10) Patent No.: US 9,959,141 B2
(45) Date of Patent: *May 1, 2018

(54) SYSTEM AND METHOD OF PROVIDING A SELF-OPTIMIZING RESERVATION IN SPACE OF COMPUTE RESOURCES

(71) Applicant: III HOLDINGS 12, LLC, Wilmington, DE (US)

(72) Inventor: David Brian Jackson, Spanish Fork, UT (US)

(73) Assignee: III Holdings 12, LLC, Wilmington, DE (US)

(*) Notice: Subject to any disclaimer, the term of this patent is extended or adjusted under 35 U.S.C. 154(b) by 236 days.

This patent is subject to a terminal disclaimer.

(21) Appl. No.: 15/049,542

(22) Filed: Feb. 22, 2016

(65) Prior Publication Data

US 2016/0170806 A1 Jun. 16, 2016

Related U.S. Application Data

(63) Continuation of application No. 10/530,577, filed on Apr. 7, 2005, now Pat. No. 9,268,607.
(Continued)

(51) Int. Cl.
*G06F 9/46* (2006.01)
*G06F 9/50* (2006.01)
(Continued)

(52) U.S. Cl.
CPC .......... *G06F 9/5027* (2013.01); *G06F 9/4881* (2013.01); *G06F 9/505* (2013.01);
(Continued)

(58) Field of Classification Search
None
See application file for complete search history.

(56) References Cited

U.S. PATENT DOCUMENTS 5,168,441 A 12/1992 Onarheim
5,175,800 A 12/1992 Gailis et al.
(Continued)

FOREIGN PATENT DOCUMENTS

EP 0 605 106 7/1994
GB 2392265 2/2004
(Continued)

OTHER PUBLICATIONS

Final Office Action on U.S. Appl. No. 14/751,529 dated Aug. 9, 2017.
(Continued)

*Primary Examiner* — Adam Lee

(57) ABSTRACT

A system and method of dynamically controlling a reservation of compute resources within a compute environment is disclosed. The method aspect of the invention comprises receiving a request from a requestor for a reservation of resources within the compute environment, reserving a first group of resources, evaluating resources within the compute environment to determine if a more efficient use of the compute environment is available and if a more efficient use of the compute environment is available, then canceling the reservation for the first group of resources and reserving a second group of resources of the compute environment according to the evaluation.

19 Claims, 3 Drawing Sheets

Related U.S. Application Data

(60) Provisional application No. 60/552,653, filed on Mar. 13, 2004.

(51) Int. Cl.
*G06F 15/16* (2006.01)
*G06F 9/48* (2006.01)

(52) U.S. Cl.
CPC .......... *G06F 9/5011* (2013.01); *G06F 9/5072* (2013.01); *G06F 15/161* (2013.01); *G06F 2209/503* (2013.01); *G06F 2209/506* (2013.01); *G06F 2209/508* (2013.01); *G06F 2209/5014* (2013.01); *G06F 2209/5015* (2013.01); *G06F 2209/5022* (2013.01)

(56) References Cited

U.S. PATENT DOCUMENTS

| | | |
|---|---|---|
| 5,276,877 A | 1/1994 | Friedrich |
| 5,307,496 A | 4/1994 | Ichinose et al. |
| 5,355,508 A | 10/1994 | Kan |
| 5,473,773 A | 12/1995 | Aman et al. |
| 5,477,546 A | 12/1995 | Shibata |
| 5,504,894 A | 4/1996 | Ferguson et al. |
| 5,550,970 A | 8/1996 | Cline et al. |
| 5,826,062 A | 10/1998 | Bishop et al. |
| 5,826,236 A | 10/1998 | Narimatsu et al. |
| 5,832,517 A | 11/1998 | Knutsen, II |
| 5,862,478 A | 1/1999 | Cutler et al. |
| 5,867,382 A | 2/1999 | McLaughlin |
| 5,881,238 A | 3/1999 | Aman et al. |
| 5,918,017 A | 6/1999 | Attanasio et al. |
| 5,920,863 A | 7/1999 | McKeehan et al. |
| 5,933,417 A | 8/1999 | Rottoo |
| 5,950,190 A | 9/1999 | Yeager |
| 5,958,003 A | 9/1999 | Preining et al. |
| 6,003,061 A | 12/1999 | Jones et al. |
| 6,021,425 A | 2/2000 | Waldron, III et al. |
| 6,067,545 A | 5/2000 | Wolff |
| 6,076,174 A | 6/2000 | Freund |
| 6,088,718 A | 7/2000 | Altschuler et al. |
| 6,098,090 A | 8/2000 | Burns |
| 6,101,508 A | 8/2000 | Wolff |
| 6,167,445 A | 12/2000 | Gai et al. |
| 6,212,542 B1 | 4/2001 | Kahle et al. |
| 6,269,398 B1 | 7/2001 | Leong |
| 6,278,712 B1 | 8/2001 | Takihiro et al. |
| 6,282,561 B1 * | 8/2001 | Jones ............ G06F 9/5011 718/104 |
| 6,298,352 B1 | 10/2001 | Kannan et al. |
| 6,314,555 B1 | 11/2001 | Ndumu et al. |
| 6,324,279 B1 | 11/2001 | Kamanek, Jr. et al. |
| 6,330,008 B1 | 12/2001 | Razdow et al. |
| 6,330,583 B1 | 12/2001 | Reiffin |
| 6,333,936 B1 | 12/2001 | Johansson et al. |
| 6,334,114 B1 | 12/2001 | Jacobs et al. |
| 6,366,945 B1 | 4/2002 | Fong et al. |
| 6,370,154 B1 | 4/2002 | Wickham |
| 6,374,297 B1 | 4/2002 | Wolf et al. |
| 6,384,842 B1 | 5/2002 | DeKoning |
| 6,418,459 B1 | 7/2002 | Gulick |
| 6,453,349 B1 * | 9/2002 | Kano ............ H04L 47/724 370/340 |
| 6,460,082 B1 | 10/2002 | Lumelsky et al. |
| 6,463,454 B1 | 10/2002 | Lumelsky et al. |
| 6,496,566 B1 | 12/2002 | Attanasio et al. |
| 6,496,866 B2 | 12/2002 | Attanasio et al. |
| 6,519,571 B1 | 2/2003 | Guheen et al. |
| 6,526,442 B1 | 2/2003 | Stupek, Jr. et al. |
| 6,529,932 B1 | 3/2003 | Dadiomov et al. |
| 6,549,940 B1 | 4/2003 | Allen et al. |
| 6,564,261 B1 | 5/2003 | Gudjonsson et al. |
| 6,571,215 B1 | 5/2003 | Mahapatro |
| 6,584,489 B1 | 6/2003 | Jones et al. |
| 6,584,499 B1 | 6/2003 | Jantz et al. |
| 6,590,587 B1 | 7/2003 | Wichelman et al. |
| 6,662,202 B1 | 12/2003 | Krusche et al. |
| 6,662,219 B1 | 12/2003 | Nishanov et al. |
| 6,687,257 B1 | 2/2004 | Balasubramanian |
| 6,690,400 B1 | 2/2004 | Moayyad et al. |
| 6,690,647 B1 | 2/2004 | Tang |
| 6,745,246 B1 | 6/2004 | Erimli et al. |
| 6,760,306 B1 | 7/2004 | Pan et al. |
| 6,771,661 B1 | 8/2004 | Chawla et al. |
| 6,825,860 B1 | 11/2004 | Hu |
| 6,829,762 B2 | 12/2004 | Arimilli et al. |
| 6,850,966 B2 | 2/2005 | Matsuura et al. |
| 6,857,938 B1 | 2/2005 | Smith et al. |
| 6,912,533 B1 | 6/2005 | Hornick |
| 6,925,431 B1 | 8/2005 | Papaefstathiou |
| 6,938,256 B2 | 8/2005 | Deng et al. |
| 6,948,171 B2 | 9/2005 | Dan et al. |
| 6,966,033 B1 | 11/2005 | Gasser et al. |
| 6,975,609 B1 | 12/2005 | Khaleghi et al. |
| 6,985,937 B1 | 1/2006 | Keshav et al. |
| 6,990,677 B1 | 1/2006 | Pietraszak et al. |
| 7,003,414 B1 | 2/2006 | Wichelman et al. |
| 7,034,686 B2 | 4/2006 | Matsumura |
| 7,035,230 B1 | 4/2006 | Shaffer et al. |
| 7,043,605 B2 | 5/2006 | Suzuki |
| 7,072,807 B2 | 7/2006 | Brown et al. |
| 7,124,410 B2 | 10/2006 | Berg et al. |
| 7,143,168 B1 | 11/2006 | BiBiasio et al. |
| 7,145,995 B2 | 12/2006 | Oltmanns et al. |
| 7,168,049 B2 | 1/2007 | Day |
| 7,171,593 B1 | 1/2007 | Whittaker |
| 7,177,823 B2 | 2/2007 | Lam et al. |
| 7,185,073 B1 | 2/2007 | Gai et al. |
| 7,188,174 B2 | 3/2007 | Rolia et al. |
| 7,191,244 B2 | 3/2007 | Jennings et al. |
| 7,197,561 B1 | 3/2007 | Lovy et al. |
| 7,222,343 B2 | 5/2007 | Heyman et al. |
| 7,225,442 B2 | 5/2007 | Dutta |
| 7,233,569 B1 | 6/2007 | Swallow |
| 7,236,915 B2 | 6/2007 | Algieri et al. |
| 7,289,619 B2 | 10/2007 | Vivadelli et al. |
| 7,296,268 B2 | 11/2007 | Darling et al. |
| 7,308,687 B2 | 12/2007 | Trossman et al. |
| 7,328,264 B2 | 2/2008 | Babka |
| 7,328,406 B2 | 2/2008 | Kalinoski et al. |
| 7,353,495 B2 | 4/2008 | Somgyi |
| 7,376,693 B2 | 5/2008 | Neiman et al. |
| 7,386,586 B1 | 6/2008 | Headley et al. |
| 7,386,850 B2 | 6/2008 | Mullen |
| 7,403,994 B1 | 7/2008 | Vogl et al. |
| 7,423,971 B1 | 9/2008 | Mohaban et al. |
| 7,502,747 B1 | 3/2009 | Pardo et al. |
| 7,502,884 B1 | 3/2009 | Shah et al. |
| 7,512,894 B1 | 3/2009 | Hintermeister |
| 7,516,455 B2 | 4/2009 | Matheson et al. |
| 7,546,553 B2 | 6/2009 | Bozak et al. |
| 7,568,199 B2 | 7/2009 | Bozak et al. |
| 7,620,706 B2 | 11/2009 | Jackson |
| 7,640,547 B2 | 12/2009 | Neiman et al. |
| 7,685,599 B2 | 3/2010 | Kanai et al. |
| 7,716,193 B2 | 5/2010 | Krishnamoorthy |
| 7,730,488 B2 | 6/2010 | Ilzuka et al. |
| 7,810,090 B2 | 10/2010 | Gebhart |
| 7,853,880 B2 | 12/2010 | Porter |
| 8,151,103 B2 | 4/2012 | Jackson |
| 8,161,391 B2 | 4/2012 | McClelland et al. |
| 8,346,908 B1 | 1/2013 | Vanyukhin et al. |
| 8,544,017 B1 | 9/2013 | Prael et al. |
| 8,782,120 B2 | 7/2014 | Jackson |
| 9,128,767 B2 | 9/2015 | Jackson |
| 2001/0023431 A1 | 9/2001 | Horiguchi |
| 2002/0004833 A1 | 1/2002 | Tonouchi |
| 2002/0007389 A1 | 1/2002 | Jones et al. |
| 2002/0018481 A1 | 2/2002 | Mor et al. |
| 2002/0031364 A1 | 3/2002 | Suzuki et al. |
| 2002/0052909 A1 | 5/2002 | Seeds |
| 2002/0052961 A1 | 5/2002 | Yoshimine et al. |
| 2002/0087699 A1 | 7/2002 | Karagiannis et al. |

(56) References Cited

U.S. PATENT DOCUMENTS

| | | |
|---|---|---|
| 2002/0099842 A1 | 7/2002 | Jennings et al. |
| 2002/0116234 A1 | 8/2002 | Nagasawa |
| 2002/0120741 A1 | 8/2002 | Webb et al. |
| 2002/0156699 A1 | 10/2002 | Gray et al. |
| 2002/0156904 A1 | 10/2002 | Gullotta et al. |
| 2002/0166117 A1 | 11/2002 | Abrams et al. |
| 2003/0005130 A1 | 1/2003 | Cheng |
| 2003/0018766 A1 | 1/2003 | Duvvuru |
| 2003/0018803 A1 | 1/2003 | El Batt et al. |
| 2003/0028645 A1 | 2/2003 | Romagnoli |
| 2003/0061260 A1 | 3/2003 | Rajkumar |
| 2003/0061262 A1 | 3/2003 | Hahn et al. |
| 2003/0088457 A1 | 5/2003 | Keil |
| 2003/0126200 A1 | 7/2003 | Wolff |
| 2003/0131043 A1 | 7/2003 | Berg et al. |
| 2003/0135615 A1 | 7/2003 | Wyatt |
| 2003/0135621 A1 | 7/2003 | Romagnoli |
| 2003/0149685 A1 | 8/2003 | Trossman et al. |
| 2003/0154112 A1 | 8/2003 | Neiman et al. |
| 2003/0158884 A1 | 8/2003 | Alford |
| 2003/0169269 A1 | 9/2003 | Sasaki et al. |
| 2003/0182425 A1 | 9/2003 | Kurakake |
| 2003/0185229 A1 | 10/2003 | Shachar et al. |
| 2003/0200109 A1 | 10/2003 | Honda et al. |
| 2003/0212792 A1 | 11/2003 | Raymond |
| 2003/0216951 A1 | 11/2003 | Ginis et al. |
| 2003/0217129 A1 | 11/2003 | Knittel et al. |
| 2003/0233378 A1 | 12/2003 | Butler et al. |
| 2003/0233446 A1 | 12/2003 | Earl |
| 2004/0010592 A1 | 1/2004 | Carver et al. |
| 2004/0030741 A1 | 2/2004 | Wolton et al. |
| 2004/0044718 A1 | 3/2004 | Fertl et al. |
| 2004/0064817 A1 | 4/2004 | Shibayama et al. |
| 2004/0073650 A1 | 4/2004 | Nakamura |
| 2004/0073654 A1 | 4/2004 | Windl |
| 2004/0083287 A1* | 4/2004 | Gao ..................... H04L 47/724 709/226 |
| 2004/0098391 A1 | 5/2004 | Robertson et al. |
| 2004/0103339 A1 | 5/2004 | Chalasani et al. |
| 2004/0103413 A1 | 5/2004 | Mandava et al. |
| 2004/0107281 A1 | 6/2004 | Bose et al. |
| 2004/0109428 A1 | 6/2004 | Krishnamurthy |
| 2004/0117768 A1 | 6/2004 | Chang et al. |
| 2004/0122970 A1 | 6/2004 | Kawaguchi et al. |
| 2004/0139202 A1 | 7/2004 | Talwar et al. |
| 2004/0139464 A1 | 7/2004 | Ellis et al. |
| 2004/0172464 A1 | 9/2004 | Nag |
| 2004/0193674 A1 | 9/2004 | Kurosawa et al. |
| 2004/0196308 A1 | 10/2004 | Blomquist |
| 2004/0199918 A1 | 10/2004 | Skovira |
| 2004/0199991 A1 | 10/2004 | Skovira |
| 2004/0204978 A1 | 10/2004 | Rayrole |
| 2004/0205101 A1 | 10/2004 | Radhakrishnan |
| 2004/0215780 A1 | 10/2004 | Kawato |
| 2004/0216121 A1 | 10/2004 | Jones et al. |
| 2004/0244006 A1 | 10/2004 | Kaufman et al. |
| 2004/0236852 A1 | 11/2004 | Birkestrand et al. |
| 2004/0243466 A1 | 12/2004 | Trzybinski et al. |
| 2004/0260746 A1 | 12/2004 | Brown et al. |
| 2005/0021291 A1 | 1/2005 | Retlich |
| 2005/0021371 A1 | 1/2005 | Basone et al. |
| 2005/0027864 A1 | 2/2005 | Bozak et al. |
| 2005/0027865 A1 | 2/2005 | Bozak et al. |
| 2005/0050270 A1 | 3/2005 | Horn et al. |
| 2005/0071843 A1 | 3/2005 | Guo et al. |
| 2005/0155033 A1 | 7/2005 | Luoffo et al. |
| 2005/0156732 A1 | 7/2005 | Matsumura |
| 2005/0163143 A1 | 7/2005 | Kalantar et al. |
| 2005/0188089 A1 | 8/2005 | Lichtenstein et al. |
| 2005/0195075 A1 | 9/2005 | McGraw |
| 2005/0197877 A1 | 9/2005 | Kalinoski |
| 2005/0203761 A1 | 9/2005 | Barr |
| 2005/0228892 A1 | 10/2005 | Riley et al. |
| 2005/0235137 A1 | 10/2005 | Barr |
| 2005/0256942 A1 | 11/2005 | McCardle et al. |
| 2005/0278760 A1 | 12/2005 | Dewar et al. |
| 2005/0283534 A1 | 12/2005 | Bigagli et al. |
| 2005/0283782 A1 | 12/2005 | Lu et al. |
| 2006/0013132 A1 | 1/2006 | Garnett et al. |
| 2006/0056291 A1* | 3/2006 | Baker ..................... H04L 43/00 370/229 |
| 2006/0097863 A1 | 5/2006 | Horowitz et al. |
| 2006/0200773 A1 | 9/2006 | Nocera et al. |
| 2006/0229920 A1 | 10/2006 | Favorel |
| 2006/0236368 A1 | 10/2006 | Raja et al. |
| 2006/0271552 A1 | 11/2006 | McChesney et al. |
| 2006/0271928 A1 | 11/2006 | Gao et al. |
| 2006/0294238 A1 | 12/2006 | Naik et al. |
| 2007/0204036 A1 | 8/2007 | Mohaban et al. |
| 2007/0220520 A1 | 9/2007 | Tajima |
| 2008/0168451 A1 | 7/2008 | Challenger et al. |
| 2008/0184248 A1 | 7/2008 | Barua et al. |
| 2008/0216082 A1 | 9/2008 | Eilam et al. |
| 2008/0235702 A1 | 9/2008 | Eilam et al. |
| 2008/0288873 A1 | 11/2008 | McCardle et al. |
| 2009/0216881 A1 | 8/2009 | Lovy et al. |

FOREIGN PATENT DOCUMENTS

| | | |
|---|---|---|
| WO | WO-98/58518 | 12/1998 |
| WO | WO-00/25485 | 5/2000 |
| WO | WO 2003/060798 | 9/2003 |
| WO | WO 2004/021109 | 3/2004 |
| WO | WO 2004/046919 | 6/2004 |
| WO | WO-2005/089245 | 9/2005 |

OTHER PUBLICATIONS

Non-Final Office Action on U.S. Appl. No. 14/709,642 dated Jul. 12, 2017.
Non-Final Office Action on U.S. Appl. No. 13/760,600 dated Jun. 15, 2017.
Notice of Allowance on U.S. Appl. No. 14/106,254 dated May 25, 2017.
Notice of Allowance on U.S. Appl. No. 14/331,718 dated Jun. 7, 2017.
Final Office Action issued on U.S. Appl. No. 12/573,967, dated Apr. 1, 2014.
Non-Final Office Action issued on U.S. Appl. No. 10/530,577, dated May 29, 2015.
Non-Final Office Action issued on U.S. Appl. No. 12/573,967, dated Mar. 1, 2012.
Non-Final Office Action issued on U.S. Appl. No. 13/760,600, dated Apr. 10, 2015.
Non-Final Office Action issued on U.S. Appl. No. 13/855,241, dated Jan. 13, 2016.
Non-Final Office Action issued on U.S. Appl. No. 13/855,241, dated Jul. 6, 2015.
Non-Final Office Action issued on U.S. Appl. No. 14/106,254, dated May 2, 2016.
Non-Final Office Action on U.S. Appl. No. 14/106,254 dated Feb. 15, 2017.
Non-Final Office Action on U.S. Appl. No. 14/331,718 dated Feb. 28, 2017.
Notice of Allowance issued on U.S. Appl. No. 12/573,967, dated Jul. 29, 2015.
Notice of Allowance on U.S. Appl. No. 10/530,577, dated Oct. 15, 2015.
Chuang Liu et al. "Design and Evaluation of a Resource Selection Framework for Grid Applications" High Performance Distributed Computing, 2002. HPDC-11 2002, Proceedings S, 11th IEEE International Symposium on Jul. 23-26, 2002, Piscataway, NJ, USA IEEE, Jul. 23, 2002 (Jul. 23, 2002), pp. 63-72, XP010601162 ISBN: 978-0-7695-1686-8.
Lars C. Wolf et al. "Concepts for Resource Reservation in Advance" Multimedia Tools and Applications, [Online] 1997, pp. 255-278, XP009102070 The Netherlands Retreived from the Internet: URL: http://www.springerlink.com/content/h25481221mu22451/fulltext.pdf [retrieved on Jun. 23, 2008].

(56) References Cited

OTHER PUBLICATIONS

Luo et al. "A Language Modeling Framework for Resource Selection and Results Merging". Conference on and Knowledge Management, 2002 ACM pp. 391-397.
Leinberger, W. et al., "Gang Scheduling for Distributed Memory Systems", University of Minnesota—Computer Science and Engineering—Technical Report, Feb. 16, 2000, vol. TR 00-014.
Brad Stone et al., UNIX Fault Management: A Guide for System Administration. Dec. 1, 1999, ISBN 0-13-026525-X, http://www.informit.com/content/images/013026525X/samplechapter/013026525.pdf.
IBM Tivoli Workload Scheduler job Scheduling Console User's Guide Feature Level 1.2 (Maintenance Release Oct. 2003), Oct. 2003, IBM Corporation, http://publib.boulder.ibm.com/tividd/td/TWS/SH19-4552-01/en_US/PDF/jsc_user.pdf.
Chen et al., "A flexible service model for advance reservation", Computer Networks, Elsevier science publishers, vol. 37, No. 3-4, pp. 251-262, Nov. 5, 2001.
Roy, Alain, "Advance Reservation API", University of Wisconsin-Madison, GFD-E.5, Scheduling Working Group, May 23, 2002.
Supercluster Research and Development Group, "Maui Administrator's Guide", Internet citation, 2002.
Snell, et al., "The Performance Impact of Advance Reservation Meta-scheduling", pp. 137-153, Springer-Verlag Berlin Heidelberg, 2000.
Liu et al., "Design and Evaluation of a Resource Selection Framework for Grid Applications," High Performance Distributed Computing, 2002.
Si et al., "A Language Modeling Framework for Resource Selection and Results Merging", CIKM 2002, Proceedings of the eleventh international conference on Information and Knowledge Management.
Wolf et al., "Concepts for Resource in Advance", Multimedia Tools and Applications, 1997.
Amiri et al., "Dynamic Function Placement Data-Intensive Cluster Computing," Jun. 2000.
Jeffrey Chase et al., Dynamic Virtual Clusters in a Grid Site Manager; Proceedings of the 12$^{th}$ IEEE International Symposium on High Performance Distributed Computing (HPDC'03) 2003 IEEE, 11 pages.
Final Office Action issued on U.S. Appl. No. 3/855241, dated Sep. 15, 2016.
Final Office Action on U.S. Appl. No. 13/760,600 dated Jan. 23, 2017.
Furmento et al. "An Integrated Grid Environment for Component Applications," Workshop on Grid Computing, 2001, pp. 26-37.
Non-Final Office Action on U.S. Appl. No. 14/709,642, dated Feb. 17, 2016.
Non-Final Office Action on U.S. Appl. No. 14/751,529, dated Nov. 14, 2016.
Buyya et al., "An Evaluation of Economy-based Resource Trading and Scheduling on Computational Power Grids for Parameter Sweep Applications," Active Middleware Services, 2000, 10 pages.
Final Office Action issued on U.S. Appl. No. 11/616,156, dated Oct. 13, 2011.
Kafil et al., "Optimal Task Assignment in Herterogenous Computing Systems," IEEE, 1997, pp. 135-146.
Le, "the Data-Ware Resource Broker", Research Project Thesis, University of Adelaide, Nov. 2003, pp. 1-63.
Maheswaran et al., "Dynamic Matching and Scheduling of a Class of Independent Tasks onto Heterogeneous Computing Systems," IEEE, 2000, pp. 1-15.
Mateescu et al., "Quality of service on the grid via metascheduling with resource co-scheduling and co-reservation," The International Journal of High Performance Computing Applications, 2003, 10 pages.
Non-Final Office Actin issued on U.S. Appl. No. 11/616,156, dated Jan. 18, 2011.
Non-Final Office Action on U.S. Appl. No. 14/842,916 dated May 5, 2017.
Notice of Allowance issued on U.S. Appl. No. 14/454,049, dated Jan. 20, 2015.
Stankovic et al., "The Case for Feedback Control Real-Time Scheduling", 1999, IEEE pp. 1-13.
Final Office Action on U.S. Appl. No. 14/709,642 dated Feb. 7, 2018.
Notice of Allowance on U.S. Appl. No. 13/760,600 dated Jan. 9, 2018.

\* cited by examiner

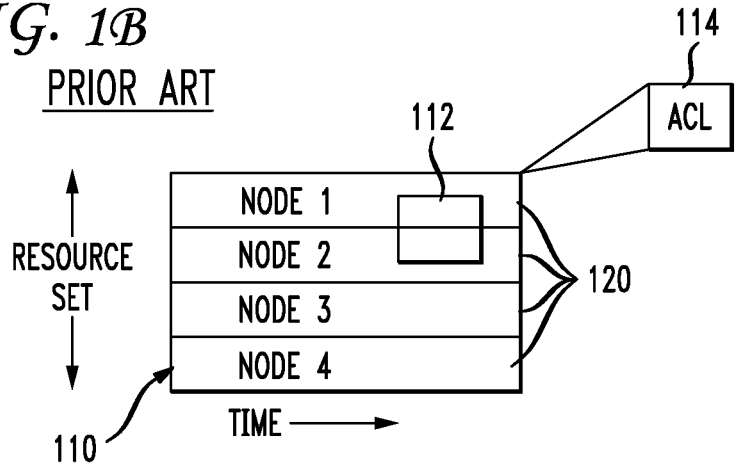
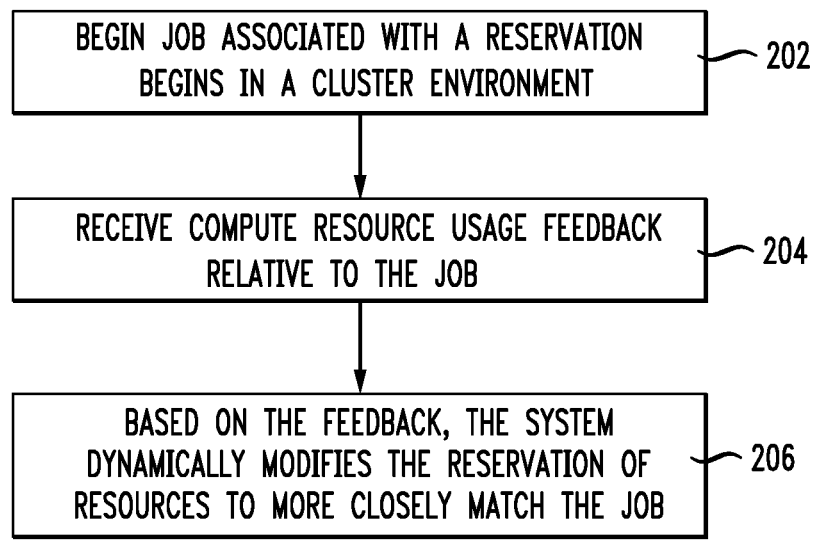

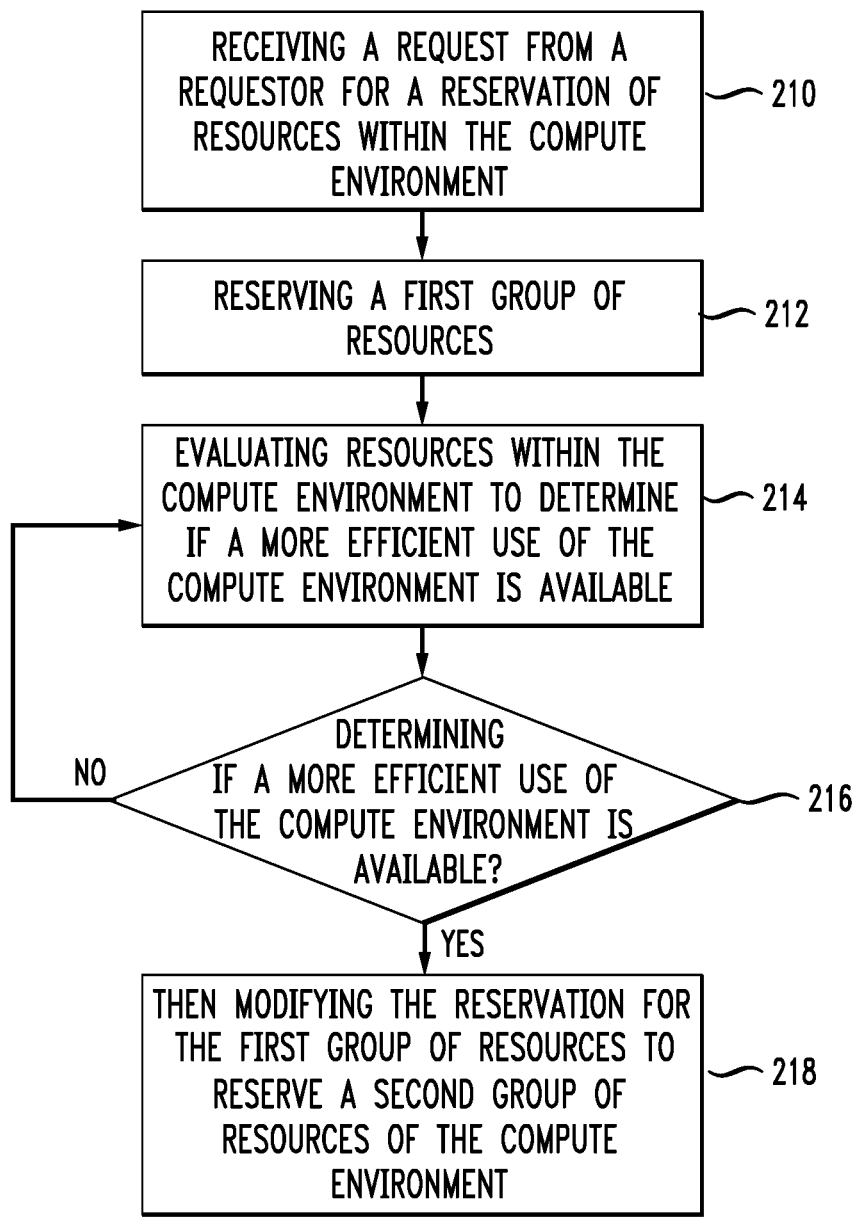

SYSTEM AND METHOD OF PROVIDING A SELF-OPTIMIZING RESERVATION IN SPACE OF COMPUTE RESOURCES

PRIORITY CLAIM

The present application is a continuation of U.S. patent application Ser. No. 10/530,577, filed Apr. 7, 2005, which claims priority to U.S. Provisional Application No. 60/552,653 filed Mar. 13, 2004, the contents of which are incorporated herein by reference in their entirety.

RELATED APPLICATIONS

The present application is related to U.S. patent application Ser. No. 10/530,583, filed Apr. 7, 2005, now U.S. Pat. No. 7,620,706, issued Nov. 17, 2009, U.S. patent Ser. No. 10/530,582, filed Aug. 11, 2006, now U.S. Pat. No. 7,971,204, issued Jun. 28, 2011, U.S. patent application Ser. No. 10/530,581, filed Aug. 11, 2006, now U.S. Pat. No. 8,413,155, issued Apr. 2, 2013, U.S. patent application Ser. No. 10/530,576, filed Jul. 29, 2008, now U.S. Pat. No. 9,176,785, issued Nov. 3, 2015, U.S. patent application Ser. No. 10/589,339, filed Aug. 11, 2006, now U.S. Pat. No. 7,490,325, issued Feb. 10, 2009, U.S. patent application Ser. No. 10/530,578, filed Nov. 24, 2008, now U.S. Pat. No. 8,151,103, issued Apr. 3, 2012, U.S. patent application Ser. No. 10/530,580, filed Apr. 7, 2005, still pending, and U.S. patent application Ser. No. 10/530,575, filed Feb. 4, 2008, now U.S. Pat. No. 8,108,869, issued Jan. 31, 2012. The content of each of these applications is incorporated herein by reference in their entirety.

BACKGROUND OF THE INVENTION

1. Field of the Invention

The present invention relates to reservations in a cluster or more specifically to a system and method of providing a self-optimizing reservation in space of compute resources.

2. Introduction

The present invention relates to a system and method of allocation resources in the context of a grid or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring grid resources over time in order to run grid applications as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will comprise a plurality of clusters as will be shown in FIG. 1A. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 1081 in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

To manage the jobs submissions, a cluster scheduler will employ reservations to insure that jobs will have the resources necessary for processing. FIG. 1B illustrates a cluster/node diagram for a cluster 124 with nodes 120. Time is along the X axis. An access control list 114 (ACL) to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Particularly, groups may want to establish a constant expansion factor and make that available to all users or they may want to make a certain subset of users that are key people in an organization and want to give them special services but only when their response time drops below a certain threshold. Given the prior art model, companies are unable to have the flexibility over their cluster resources.

To improve the management of cluster resources, what is needed in the art is a method for a scheduler, a cluster scheduler or cluster workload management system to manage resources in a dimensional addition to space. Furthermore, given the complexity of the cluster environment, what is needed is more power and flexibility in the reservations process.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention herein relates to systems, methods and computer-readable media for optimizing the resources used in a compute environment such as a cluster or a grid. The method aspect of the invention dynamically controls a reservation of compute resources by receiving a request from a requestor for a reservation of resources within the compute environment, reserving a first group of resources and evaluating resources within the compute environment to determine if a more efficient use of the compute environment is available. If a more efficient use of the compute environment is available, then the method comprises canceling the reservation for the first group of resources and reserving a second group of resources of the compute environment according to the evaluation. The method may also include modifying a current reservation of resources to improve the efficient use of the environment.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates a job submitted to a resource set in a computing environment;

FIG. 2A illustrates a concept of the present invention of dynamic reservations; and FIG. 2B illustrates an embodiment of the invention associated with self-optimizing reservations in space.

DETAILED DESCRIPTION OF THE INVENTION

Figure 1A:
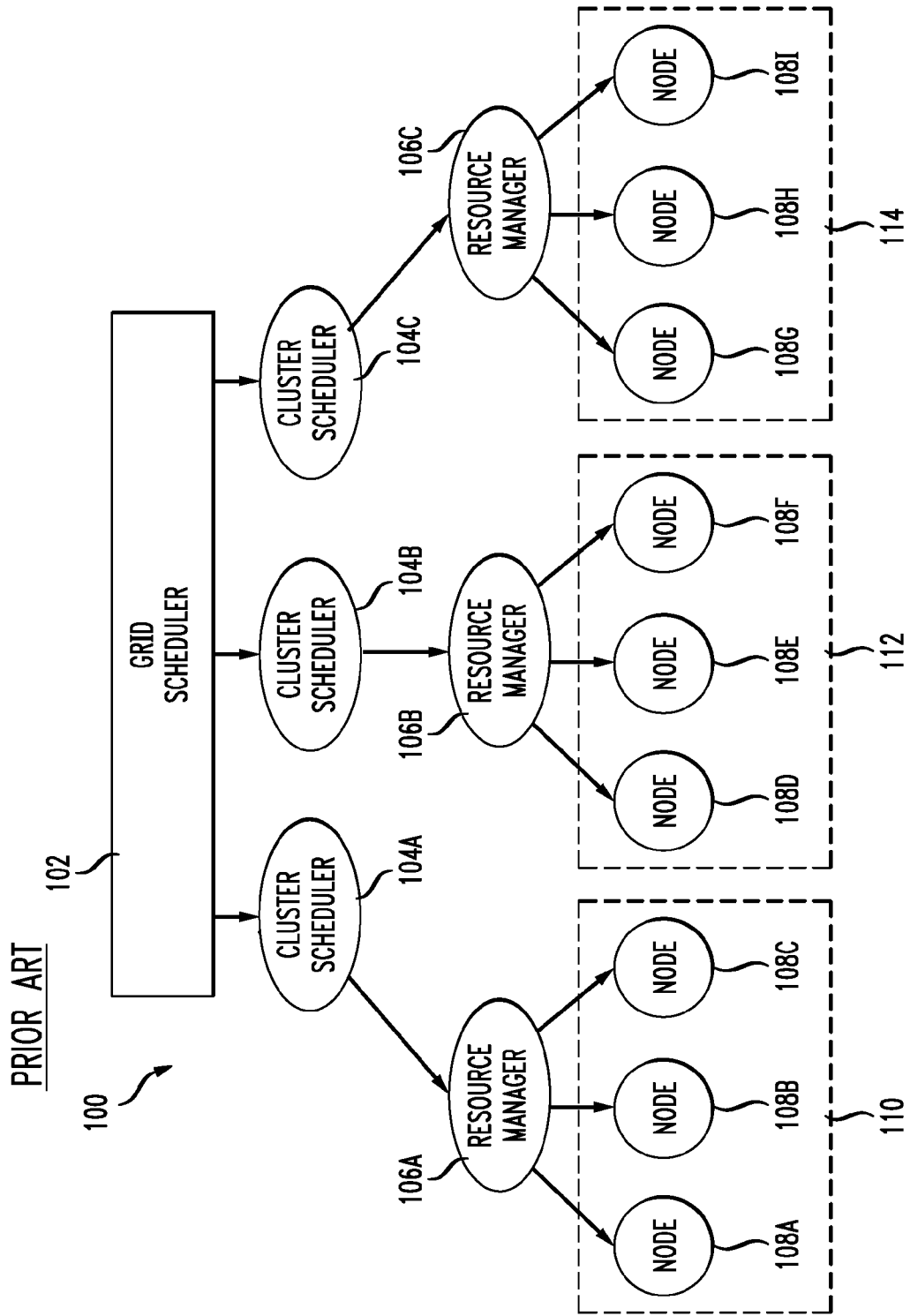
FIG. 1A illustrates generally a grid scheduler, cluster scheduler, and resource managers interacting with compute nodes.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention relates to resource reservations in the context of a cluster environment. The cluster may be operated by a hosting facility, hosting center, a virtual hosting center, data center, grid, cluster and/or utility-based computing environments.

Every reservation consists of three major components: a set of resources, a timeframe, and an access control list (ACL). Additionally, a reservation may also have a number of optional attributes controlling its behavior and interaction with other aspects of scheduling. A reservation's ACL specifies which jobs can use the reservation. Only jobs which meet one or more of a reservation's access criteria are allowed to use the reserved resources during the reservation timeframe. The reservation access criteria comprises, in one example, at least following: users, groups, accounts, classes, quality of service (QOS) and job duration. A job may be any venue or end of consumption of resource for any broad purpose, whether it be for a batch system, direct volume access or other service provisioning.

A workload manager, or scheduler, will govern access to the compute environment by receiving requests for reservations of resources and creating reservations for processing jobs. A workload manager functions by manipulating five primary, elementary objects. These are jobs, nodes, reservations, QOS structures, and policies. In addition to these, multiple minor elementary objects and composite objects are also utilized. These objects are also defined in a scheduling dictionary.

A workload manager may operate on a single computing device or multiple computing devices to manage the workload of a compute environment. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention have any specific hardware components and any known or future developed hardware configurations are contemplated as within the scope of the invention when the computing device operates as is claimed.

An ACL for the reservation may have a dynamic aspect instead of simply being based on who the requester is. The ACL decision making process is based at least in part on the current level of service or response time that is being delivered to the requester. To illustrate the operation of the ACL, assume that a user submits a job and that the ACL reports that the only job that can access these resources are those that have a queue time that currently exceeds two hours. If the job has sat in the queue for two hours it will then access the additional resources to prevent the queue time for the user from increasing significantly beyond this time frame. The decision to allocate these additional resources can be keyed off of utilization of an expansion factor and other performance metrics of the job.

Whether or not an ACL is satisfied is typically and preferably determined the scheduler 104A. However, there is no restriction in the principle of the invention regarding where or on what node in the network the process of making these allocation of resource decisions occurs. The scheduler 104A is able to monitor all aspects of the request by looking at the current job inside the queue and how long it has sat there and what the response time target is and the scheduler itself determines whether all requirements of the ACL are satisfied. If requirements are satisfied, it releases the resources that are available to the job. A job that is located in the queue and the scheduler communicating with the scheduler 104A. If resources are allocated, the job is taken from the queue and inserted into the reservation in the cluster.

An example benefit of this model is that it makes it significantly easier for a site to balance or provide guaranteed levels of service or constant levels of service for key players or the general populace. By setting aside certain resources and only making them available to the jobs which threaten to violate their quality of service targets it increases the probability of satisfying it.

The disclosure now continues to discuss reservations further. An advance reservation is the mechanism by which the present invention guarantees the availability of a set of resources at a particular time. With an advanced reservation a site now has an ability to actually specify how the scheduler should manage resources in both space and time. Every reservation consists of three major components, a list of resources, a timeframe (a start and an end time during which it is active), and an access control list (ACL). These elements are subject to a set of rules. The ACL acts as a doorway determining who or what can actually utilize the resources of the cluster. It is the job of the cluster scheduler to make certain that the ACL is not violated during the reservation's lifetime (i.e., its timeframe) on the resources listed. The ACL governs access by the various users to the resources. The ACL does this by determining which of the jobs, various groups, accounts, jobs with special service levels, jobs with requests for specific resource types or attributes and many different aspects of requests can actually come in and utilize the resources. With the ability to say that these resources are reserved, the scheduler can then enforce true guarantees and can enforce policies and enable dynamic administrative tasks to occur. The system greatly increases in efficiency because there is no need to partition the resources as was previously necessary and the administrative overhead is reduced it terms of staff time because things can be automated and scheduled ahead of time and reserved.

As an example of a reservation, a reservation may specify that node002 is reserved for user John Doe on Friday. The scheduler will thus be constrained to make certain that only John Doe's jobs can use node002 at any time on Friday. Advance reservation technology enables many features including backfill, deadline based scheduling, QOS support, and meta scheduling.

There are several reservation concepts that will be introduced as aspects of the invention. These include dynamic reservations, co-allocating reservation resources of different types, reservations that self-optimize in time, reservations that self-optimization in space, reservations rollbacks and reservation masks. Each of these will be introduced and explained.

Dynamic reservations are reservations that are able to be modified once they are created. FIG. 2A illustrates a dynamic reservation. Attributes of a reservation may change based on a feedback mechanism that adds intelligence as to ideal characteristics of the reservation and how it should be applied as the context of its environment or an entities needs change. One example of a dynamic reservation is a reservation that provides for a guarantee of resources for a project unless that project is not using the resources it has been given. A job associated with a reservation begins in a cluster environment (202). At a given portion of time into processing the job on compute resources, the system receives compute resource usage feedback relative to the job (204). For example, a dynamic reservation policy may apply which says that if the project does not use more than 25% of what it is guaranteed by the time that 50% of its time has expired, then, based on the feedback, the system dynamically modifies the reservation of resources to more closely match the job (206). In other words, the reservation dynamically adjust itself to reserve X % fewer resources for this project, thus freeing up unused resource for others to use.

Another dynamic reservation may perform the following step: if usage of resources provided by a reservation is above 90% with fewer than 10 minutes left in the reservation then the reservation will attempt to add 10% more time to the end of the reservation to help ensure the project is able to complete. In summary, it is the ability for a reservation to receive manual or automatic feedback to an existing reservation in order to have it more accurately match any given needs, whether those be of the submitting entity, the community of users, administrators, etc. The dynamic reservation improves the state of the art by allowing the ACL to the reservation to have a dynamic aspect instead of simply being based on who the requestor is. The reservation can be based on a current level of service or response time being delivered to the requestor.

Another example of a dynamic reservation is consider a user submitting a job and the reservation may need an ACL that requires that the only job that can access these resources are those that have a queue time that is currently exceeded two hours. If the job has sat in the queue for two hours it will then access the additional resources to prevent the queue time for the user from increasing significantly beyond this time frame. You can also key the dynamic reservation off of utilization, off of an expansion factor and other performance metrics of the job.

The ACL and scheduler are able to monitor all aspects of the request by looking at the current job inside the queue and how long it has sat there and what the response time target is. It is preferable, although not required, that the scheduler itself determines whether all requirements of the ACL are satisfied. If the requirements are satisfied, the scheduler releases the resources that are available to the job.

The benefits of this model is it makes it significantly easier for a site to balance or provide guaranteed levels of service or constant levels of service for key players or the general populace. By setting aside certain resources and only making them available to the jobs which threaten to violate their quality of service targets it increases the probability of satisfying it.

FIG. 2B illustrates another aspect of the invention, which is the dynamic, self-optimizing reservation in space. This reservation seeks to improve the efficient use of the compute resources. This is in contrast to a reservation that may self-optimize to improve a response time for jobs submitted by the reservation requestor. As shown in FIG. 2B, the method comprises receiving a request from a requestor for a reservation of resources within the compute environment (210), reserving a first group of resources (212), evaluating resources within the compute environment to determine if a more efficient use of the compute environment is available (214) and determining if a more efficient use of the compute environment is available (216). If a more efficient use of the compute environment is available, then the method comprises modifying the reservation for the first group of resources to reserve a second group of resources of the compute environment (218). The modification may comprise canceling the first reservation and making a second reservation of a second group of resources that is more efficient or the modification may comprise maintaining the current reservation but changing the resources reserved.

The reservation may be identified as self-optimizing either by the system, by a policy or by the requestor. The self-optimizing classification may further mean that it is self-optimizing in terms of the efficiency of the compute resources or in some other terms such as improved time to process jobs.

The compute environment is one of a cluster environment, grid environment or some other plurality of computing devices, such as computer servers that are networked together. The reservation for the first group of resources and the reservation for the second group of resources may overlap in terms of time or resources (space).

The request for resources may include a required criteria and a preferred criteria. The criteria may based cost-based (least expensive) time based (fastest processing time) and so forth. It is preferred that the reservation of the first group of resources meets the required criteria and the evaluation of resources within the cluster environment determines if use of the resources in the compute environment can be improved further comprises evaluating resources to determine if at least one of the preferred criteria can be met by modifying the reservation of resources.

The determination of whether the use of the compute environment can be improved can include a comparison of a cost of canceling the first group of resources and reserving the second group of resources with the improved use of the compute environment gained from meeting at least one of the preferred criteria. In this case, if the cost of canceling the reservation of first group of resources and reserving the second group of resources is greater than improved usage of the compute environment gained by meeting at least one of the preferred criteria, then the reservation of first group of resources is not cancelled. A threshold value may be established to determine when it is more efficient to cancel the reservation of first group of resources and reserve the second group of resources to meet at least one of the preferred criteria.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
reserving a first group of compute resources within a compute environment based on a request for the compute resources to yield a reservation of the first group of compute resources, the first group of compute resources having a first value that is used to determine a threshold value;

evaluating the compute environment to determine a second value for a second group of compute resources within the compute environment;

comparing the second value of the second group of compute resources with the threshold value to yield a determination;

if the determination indicates that the second value of the second group of compute resources is an improvement over the threshold value, then modifying the reservation from the first group of compute resources to the second group of compute resources of the compute environment; and allocating the second group of compute resources according to the reservation, wherein the improvement is an improved resource allocation gained from meeting at least one preferred criterion.

2. The method of claim 1, wherein the compute environment is one of an enterprise compute farm, a cluster and a grid.

3. The method of claim 1, wherein the request further comprises the at least one preferred criterion and at least one required criterion.

4. The method of claim 3, wherein the evaluating further comprises identifying compute resources that are available and meet explicit or implicit preferred criteria of the reservation.

5. The method of claim 4, wherein available compute resources comprise compute resources in an up state with no partial or complete failure.

6. The method of claim 3, wherein the reservation of the first group of compute resources meets a required criterion.

7. The method of claim 6, wherein evaluating compute resources within the compute environment further comprises determining if at least one of the preferred criteria can be met by modifying the first group of compute resources allocated for the reservation.

8. The method of claim 7, wherein the evaluating comprises a comparison of a cost of migrating the reservation from the first group of compute resources to the second group of compute resources with the improved resource allocation gained from meeting the at least one of the preferred criterion.

9. The method of claim 8, wherein the reservation is not modified if the cost of modifying the reservation from the first group of compute resources to the second group of compute resources is equal to or higher than either the threshold value or the improved resource allocation of the compute environment gained by meeting the at least one of the preferred criteria.

10. The method of claim 8, wherein the evaluating further uses a per-reservation policy.

11. The method of claim 10, wherein the per-reservation policy is at least one of an administrator policy, a user-based policy, a policy of never taking an action, a policy of always taking an action and a cost-based policy.

12. The method of claim 1, wherein modifying the reservation further comprises at least one of canceling the reservation and creating a new reservation, dynamically modifying attributes of an existing reservation, and dynamically modifying attributes of the first group of compute resources to better satisfy the reservation.

13. The method of claim 1, wherein the reservation for the first group of compute resources and a second reservation for the second group of compute resources overlap.

14. The method of claim 1, wherein the request is identified as a self-optimizing request.

15. The method of claim 14, wherein a requestor of the request identifies the request as self-optimizing.

16. The method of claim 14, wherein the request is identified as self-optimizing in space.

17. The method of claim 14, wherein a requestor of the request is charged more for a self-optimizing request relative to a charge for a non-self-optimizing request.

18. A system comprising:
a processor; and
a computer-readable storage medium storing instructions which, when executed by the processor, cause the processor to perform operations comprising:
reserving a first group of compute resources within a compute environment based on a request for the compute resources to yield a reservation, the first group of compute resources having a first value that is used to determine a threshold value;
evaluating the compute environment to determine a second value for a second group of compute resources within the compute environment;
comparing the second value of the second group of compute resources with the threshold value to yield a determination;
if the determination indicates that the second value of the second group of compute resources is an improvement over the threshold value, then modifying the reservation from the first group of compute resources to the second group of compute resources of the compute environment; and
allocating the second group of compute resources according to the reservation, wherein the improvement is an improved resource allocation gained from meeting at least one preferred criterion.

19. A non-transitory computer-readable medium storing instructions which, when executed by a computing device, cause the computing device to perform operations comprising:
reserving a first group of compute resources within a compute environment based on a request for the compute resources to yield a reservation, the first group of compute resources having a first value that is used to determine a threshold value;
evaluating the compute environment to determine a second value for a second group of compute resources within the compute environment;
comparing the second value of the second group of compute resources with the threshold value to yield a determination;
if the determination indicates that the second value of the second group of compute resources is an improvement over the threshold value, then modifying the reservation from the first group of compute resources to the second group of compute resources of the compute environment; and
allocating the second group of compute resources according to the reservation, wherein the improvement is an improved resource allocation gained from meeting at least one preferred criterion.

* * * * *